United States Patent
Kimura

Patent Number: 5,692,591
Date of Patent: Dec. 2, 1997

[54] ELECTROMAGNETIC COUPLING DEVICE

[75] Inventor: Takashi Kimura, Kiryu, Japan

[73] Assignee: Ogura Clutch Co., Ltd., Japan

[21] Appl. No.: 621,830

[22] Filed: Mar. 22, 1996

[30] Foreign Application Priority Data

Mar. 24, 1909 [JP] Japan .................. 7 091693
Sep. 6, 1995 [JP] Japan .................. 7 254654

[51] Int. Cl.⁶ .................. F16D 27/108; F16D 27/14
[52] U.S. Cl. .................. 192/84.941; 192/55.6; 192/84.961; 192/200; 192/209; 464/83; 464/85
[58] Field of Search .................. 192/84.94, 84.941, 192/84.961, 84.96, 84.5, 55.6, 30 V, 209, 200; 464/83, 85, 89, 137

[56] References Cited

U.S. PATENT DOCUMENTS

| | | | |
|---|---|---|---|
| 472,707 | 4/1892 | Hunt | 464/83 X |
| 1,723,886 | 8/1929 | Pfaff | 464/83 X |
| 3,752,279 | 8/1973 | Briar | 192/84.941 |
| 4,972,932 | 11/1990 | Nakamura et al. | 192/84.94 |
| 5,009,297 | 4/1991 | Gonda | 192/84.941 |
| 5,046,594 | 9/1991 | Kakinuma | 192/84.961 |
| 5,184,705 | 2/1993 | Sekiguchi et al. | 192/84.941 |
| 5,361,883 | 11/1994 | Yamamoto | 192/84.961 |

*Primary Examiner*—Rodney H. Bonck
*Attorney, Agent, or Firm*—Reising, Ethington, Barnard & Perry, P.L.L.C.

[57] ABSTRACT

An armature assembly (4 or 15) for an electromagnetic coupling device has a stop plate (9), rubber dampers (11) and an armature (12). Stop plate (9), which is formed in a press from a single steel plate, has a boss (9b), flanges (9c) and a periphery wall (9a). The periphery wall (9a) reinforces the stop plate (9) and forms damper covers (9e) on the ends of the flanges (9c). The damper covers (9e) have a wall surface (9d) that surrounds the damper chamber except for an opening on one side of the damper cover facing toward the boss (9b). A rubber damper (11) with a torque pin (10) is mounted in each damper cover (9e). An armature (12) is secured to the torque pins (10) by staking. The opening in one side of the damper cover permits the rubber damper 11 adjacent to the opening to move toward the torque pin (10) when that portion of the rubber damper is subjected to a tension force. This movement of the rubber damper (11) reduces the maximum stress in the damper and increases damper life.

7 Claims, 4 Drawing Sheets

ELECTROMAGNETIC COUPLING DEVICE

BACKGROUND OF THE INVENTION

1. Technical Field.

This invention relates to an electromagnetic coupling device in which an armature is magnetically attracted against the resilient force of rubber dampers and more particularly to an improved armature assembly stop plate with damper covers housing rubber dampers.

2. Description of the Prior Art.

Compressors for compressing a gas are driven by an engine through conventional electromagnetic coupling devices as disclosed in U.S. Pat. No. 5,184,705, the disclosure of which is incorporated herein by reference. Torque, for driving the compressor, is transmitted from the engine to a rotor of the coupling device by an endless belt trained around the rotor and a pulley on the engine output shaft. An armature assembly is attached to a drive shaft of the compressor and includes an armature that can be magnetically fastened to the rotor to transmit torque to the compressor drive shaft or can be released from the rotor to discontinue the transmission of torque to the compressor drive shaft. The armature assembly includes an armature hub secured to the compressor drive shaft. A stop plate is fixed to the armature hub. A plurality of damper covers, with peripheral walls that form a damper chamber are secured to the stop plate. A rubber damper is mounted in each damper cover. Torque transmission members each have one end imbedded in one of the rubber dampers and another end secured to the armature. The rubber dampers urge the armature toward the stop plate and away from the rotor. Torque to drive the compressor passes from the rotor to the armature and the torque transmission members, to the rubber dampers, to each damper cover, to the stop plate and the armature hub, and to the compressor drive shaft when magnetic force clamps the armature to the rotor. When the magnetic force is discontinued, the rubber dampers pull the armature away from the rotor and into contact with the stop plate thereby permitting the rotor to rotate freely relative to the armature assembly and the compressor drive shaft.

In the conventional magnetic coupling device, each rubber damper is compressed in the direction of rotation due to the load occurring when the armature is magnetically fastened to the rotor. Compression forces in the compressed rubber dampers act on the chamber walls of the damper covers attached to with the stop plate. Each rubber damper is surrounded by a chamber wall of a damper cover. The chamber wall receives the compression forces on the inside in the radial direction in which the damper rubber is compressed. Substantial resilient deformation occurs in the rubber damper and cracks are liable to occur. Substantial compression, shear and tension stresses on the vulcanized adhesive surface between the rubber damper and the torque transmitting member also occurs and separation is liable to occur between the rubber damper and the torque transmitting member.

SUMMARY OF THE INVENTION

An object of the invention is to improve the durability of the rubber dampers of an armature assembly. A further object of the invention is to form an armature assembly stop plate and a plurality of integral damper covers from a single flat metal plate. A still further object of the invention is to simplify the construction of an armature assembly.

Electromagnetic coupling device of a first embodiment of the invention has an armature assembly with a boss secured to an armature hub and a plurality of integral damper covers. The damper covers and the integral boss are formed into a stop plate from a press molded sheet steel plate. Portions of the sheet steel plate are bent in an axial direction to form the walls of each damper cover. These damper cover walls extend partially around each rubber damper chamber and leave an opening in the wall. The opening faces toward the boss of the stop plate on the side in which the rubber damper would be pulled in tension while transmitting torque if the opening did not exist. The opening allows the portion of the rubber damper that is not compressed to transmit torque, to move with a torque pin thereby reducing resilient deformation of the rubber damper on its side adjacent to the open area in the damper cover wall.

The stop plate has a plurality of flanges that extend radially outward from the central boss. A damper cover is formed on a free end of each of the flanges. A periphery wall is formed by bending the periphery of the flanges and the central boss in a axial direction in a press. The portion of the periphery wall on the tips of the flanges form the walls of the damper covers. The portions of the periphery walls that extend from the damper covers strengthen the flanges and the boss of the stop plate.

The flanges extend tangentially from the boss in the direction of rotation. By positioning the flanges relative to the boss along a tangent to the boss, damper covers on the tips of the flanges are open in a direction facing the boss on the side in which the rubber damper is pulled during operation. Since there is no damper cover wall in the damper cover open area to pull the rubber damper, substantial resilient deformation of the rubber damper is avoided adjacent the open area of the damper cover.

Contact projections can be provided on the stop plate to hold the armature away from the damper cover, hold the torque transmitting member in a position in which it extends through a through hole in the bottom of the damper cover and maintains the rubber damper in a position in which an internal spring force is exerted to urge the armature toward the contact projections. This initial spring force holds the armature out of contact with the rotor when the coupler is disengaged. To engage the coupler, electromagnetic force induced by the coil overcomes the axial force exerted on the armature by the rubber dampers and moves the armature into engagement with the rotor.

DESCRIPTION OF THE DRAWINGS

Other advantages of the present invention will be readily appreciated as the same become better understood by reference to the following detailed description when considered in connection with the accompanying drawings wherein.

BEST MODE CARRYING OUT THE INVENTION

Figure 1:
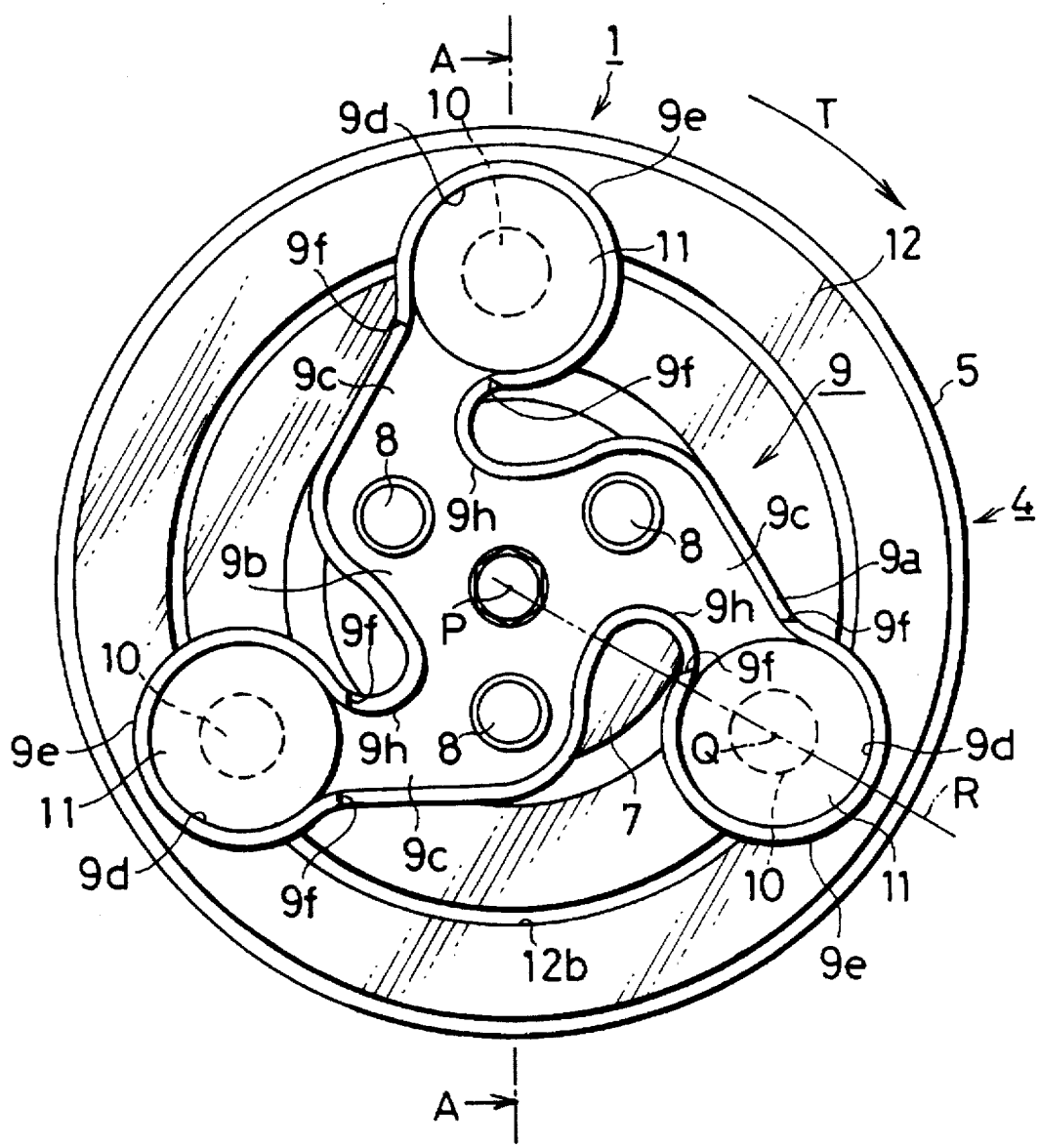
FIG. 1 is a front elevational view of an electromagnetic coupling device employing an embodiment of the invention.
Figure 2:
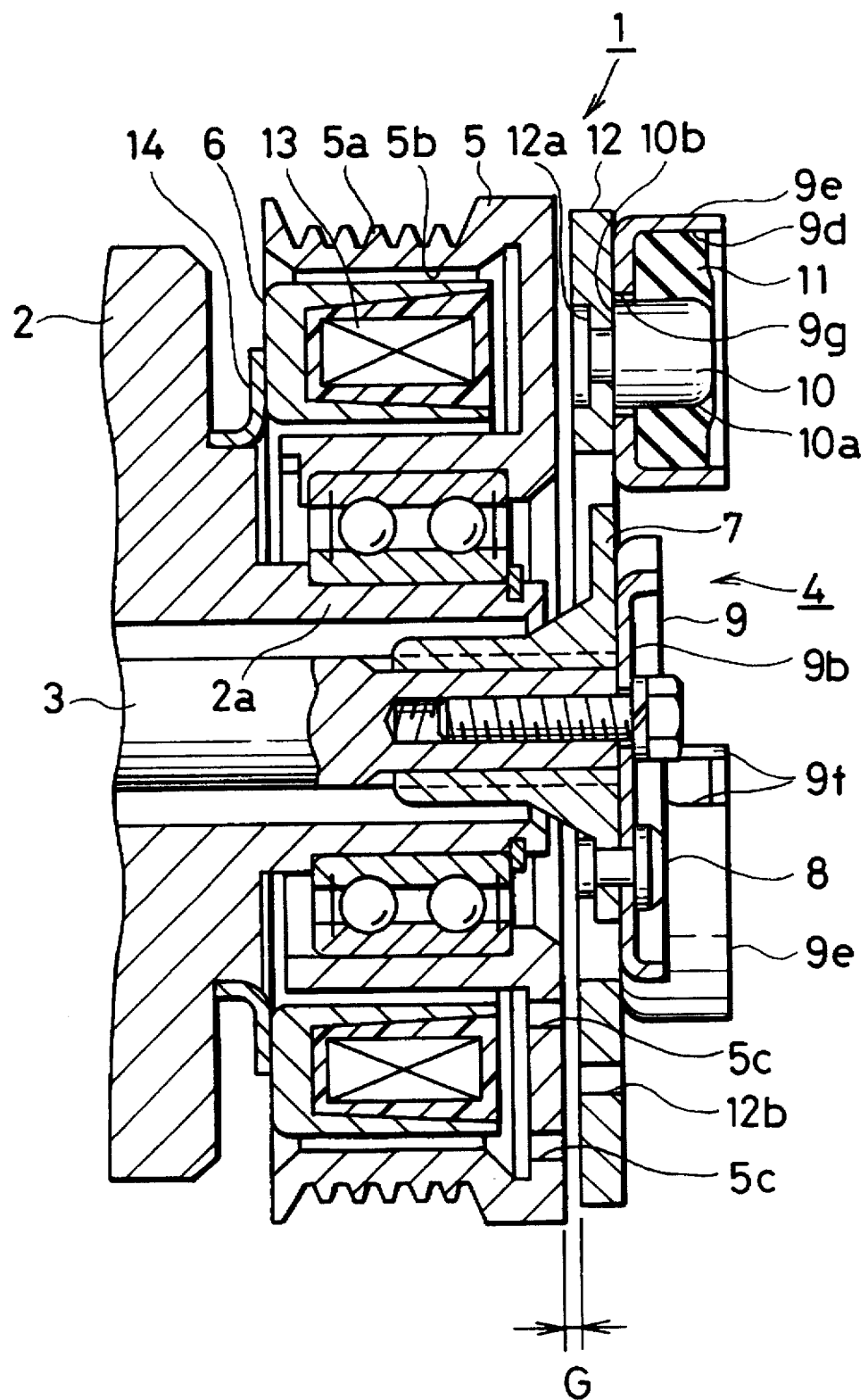
FIG. 2 is a cross-sectional view taken along lines A—A in FIG. 1.

An embodiment of the invention having three rubber dampers 11 is shown in FIGS. 1 and 2. The electromagnetic coupling device 1 which is illustrated in these figures is fitted to a compressor 2 for compressing a gas. The coupling device 1 drives the compressor 2 by transmitting rotational motion from an engine to the compressor. The coupling device 1 comprises an armature assembly 4 fitted to the rotational shaft 3 of the compressor 2, a rotor 5 rotatably journalled on the cylindrical part 2a of the compressor 2 by a bearing, and a field core 6 supported on the housing of the compressor 2.

A stop plate 9 of the armature assembly 4 is secured to the flange area of an armature hub 7 by rivets 8. The armature hub 7 is attached to one end of the rotational shaft 3 by splines and is rotatable with the shaft. A bolt passes through a central hole in the stop plate 9 and is screwed into a threaded bore in the shaft 3. The stop plate 9 abuts against the end of the rotational shaft 3 and is held in place by the bolt. It should be noted that there will be occasions when a shim is interposed between the end of the rotational shaft 3 and the stopper plate 9 in order to adjust the gap G which is discussed herein below.

The main stages in the production of the stopper plate 9 include a first stage in which a semi-finished article with the shape in plan as shown in FIG. 1 is formed by stamping a steel sheet in a press. During a second stage, the outer periphery of the semi-finished article is bent in an axial direction by a press to form a peripheral wall 9a. In the third stage, holes through which the torque pins 10, the rivets 8 and the bolt pass, are stamped through the stop plate 9.

The stop plate 9 includes a boss 9b secured to the armature hub 7 by rivets 8. A plurality of flanges 9c (three in FIG. 1) extend tangentially from the boss 9b in the direction of rotation indicated by the arrow T in FIG. 1. Damper covers 9e surrounded by walls 9d are on the ends of the flanges 9c. A portion of the peripheral wall 9a forms the chamber walls 9d that are open to the boss 9b. The peripheral wall 9a of the stop plate 9 is formed such that the peripheral walls of the damper cover 9e have a greater length in the axial direction than the peripheral walls of the boss 9b and the flanges 9c, and has stepped parts 9f where the long portion in the damper covers 9e join the peripheral walls of the boss and flanges. In the stop plate 9, the above-mentioned tangent is, for example, a straight line extending in the direction of rotation and passing through the center of the rivet 8 and the center of the torque pins 10.

Cylindrical rubber dampers 11 are fitted under pressure and housed in the damper covers 9e of the stop plate 9. Torque pins 10 acting as torque transmitting members are adhered by vulcanization in the middle of the cylindrical rubber dampers 11. It will be noted that the arrangement is such that an arc-shaped bevelled area 10a is formed on the head of the large diameter cylindrical portion at one end of the torque pin 10, and this head is embedded in the rubber damper 11.

The small diameter cylindrical portion at the other end of the torque pin 10 projects from a through hole 9g provided in the damper cover 9e away from the damper cover 9e and is riveted or staked inside the stepped hole 12a of an armature 12. The armature 12 faces the rotor 5 in the axial direction and is spaced from the rotor leaving a predetermined gap G when the armature 12 is in contact with a surface on the stop plate 9. The above-mentioned riveting is carried out in such a way that the end surface 10b of the large diameter cylindrical portion of the torque pin 10 makes contact with the armature 12. When the armature 12 is in contact with the side surface of the stop plate 9, and the sides of the center of the rubber dampers 11, which are limited in their movement by the bottom of the damper cover 9e, are resiliently deformed toward the armature 12. Due to the resilient deformation, the rubber damper 11 is put under an initial spring loading (restoring force). The reference 12b is a circular arc-shaped slit provided in the armature 12.

The rotor 5 is a member with a channel-shaped cross-section open in an axial direction. Poly-V belt grooves 5a are formed on the outer circumference of the rotor 5. An endless poly-V belt, which is not depicted, is trained around the rotor 5 and a drive pulley on an engine. A field core 6 provided on its inside with an electromagnetic coil 13 is supported inside the ring-shaped channel 5b of the rotor by a support ring 14 mounted on the housing of the compressor 2. A pair of circular arc-shaped slits 5c are provided in the rotor 5.

As shown in FIG. 1, the stop plate 9 has formed in it a circular arc-shaped peripheral wall 9h intersected by a hypothetical line R connecting the central point P of the rotor shaft 3 and the central point Q of the torque pin 10, and, as viewed relative to this hypothetical line R, the chamber wall 9d of the damper cover 9e opens to boss 9b on the side in which the rubber damper 11 will be pulled. This is the side opposite the direction of rotation T. Consequently, the side of the rubber damper 11 which is compressed (the side in the direction of rotation T) is completely engaged and under pressure at the chamber wall 9d of the damper cover 9e.

In an electromagnetic coupling device i with a configuration described above, the rotor 5, which is coupled by a belt to an engine, turns. The armature 12 is magnetically attracted and pulled toward the rotor 5 against the resilient force of the rubber damper 11 due to the magnetic pull of the magnetic flux generated by a current passing through the electromagnetic coil 13. Upon engagement between the armature 12 and the rotor 5, the rotation of the rotor 5 is transmitted to the rotational shaft 3 using the rubber damper 11 of the armature assembly 14 as the drive transmission path. The compressor 2 is driven. Further, because the magnetic flux disappears when the current passed in the electromagnetic coil 13 is cut, the armature 12 separates from the rotor 5, and withdraws toward the stopper plate 9 leaving a gap G, under the resilient force (restoring force) of the rubber damper 11. Then the shaft 3 of the compressor 2 stops rotating.

Compression stresses, tension stresses and shear stresses will act on the rubber damper 11 when the coupling device is engaged. Substantial resilient deformation of the rubber damper 11 due to compression stress is prevented because the side of rubber damper 11 which is compressed is completely engaged and under pressure at the chamber wall 9d of the damper cover 9e and an opening is provided in the wall 9d of the damper cover 9e on the side in which the rubber damper 11 is subjected to a pull or tension force. The opening in the wall 9d reduces the resilient pre-load in the rubber damper 11 tending to force the torque pin 10 away from the opening when the torque pin is transmitting a small torque load. The opening in the wall 9d also reduces the tension load exerted by one side of rubber damper 11 on the torque pin 10 when the torque pin is transmitting a large torque load.

Figure 3:
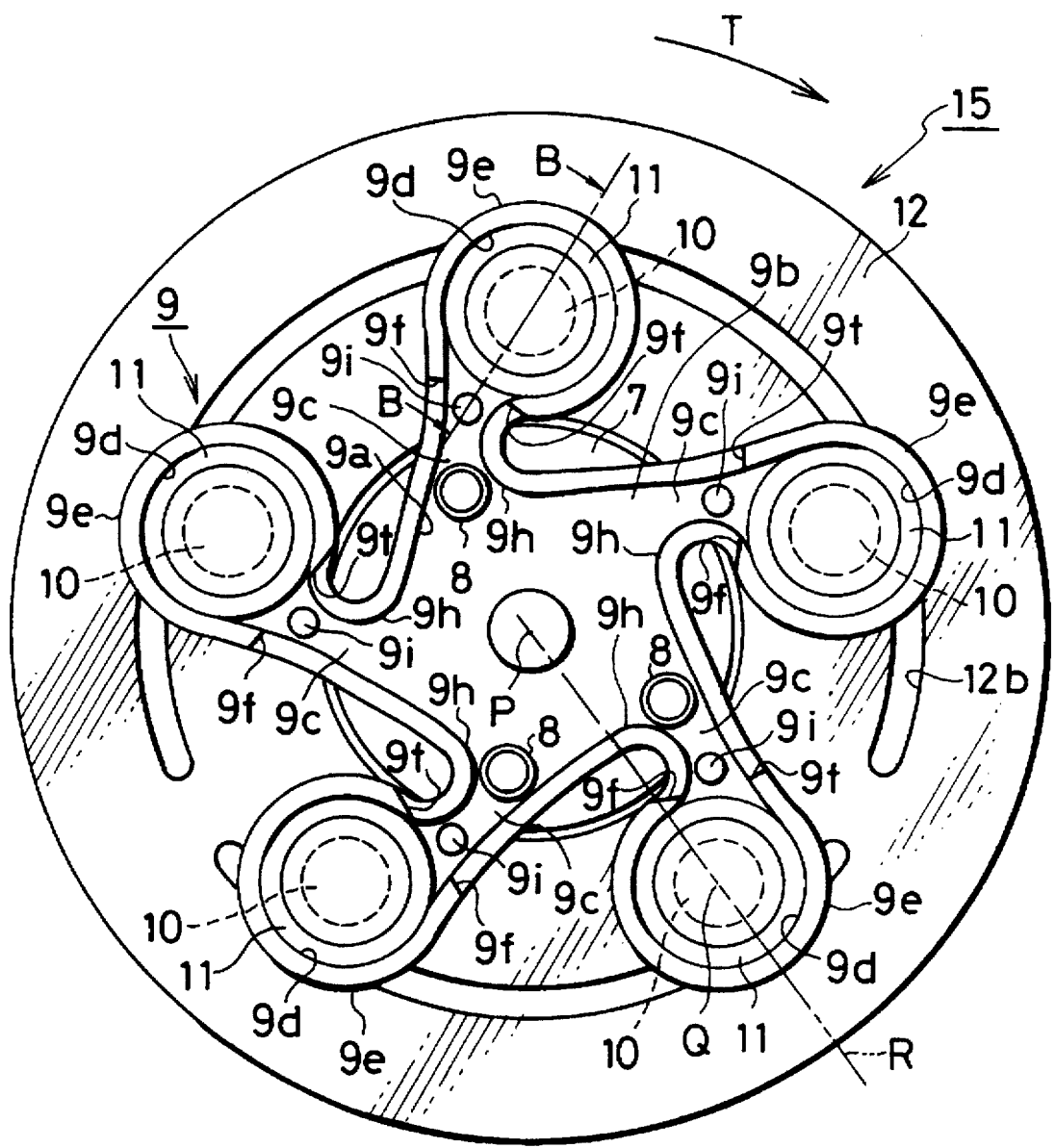
FIG. 3 is a front elevational view of an armature assembly employing an embodiment of the invention.
Figure 4:
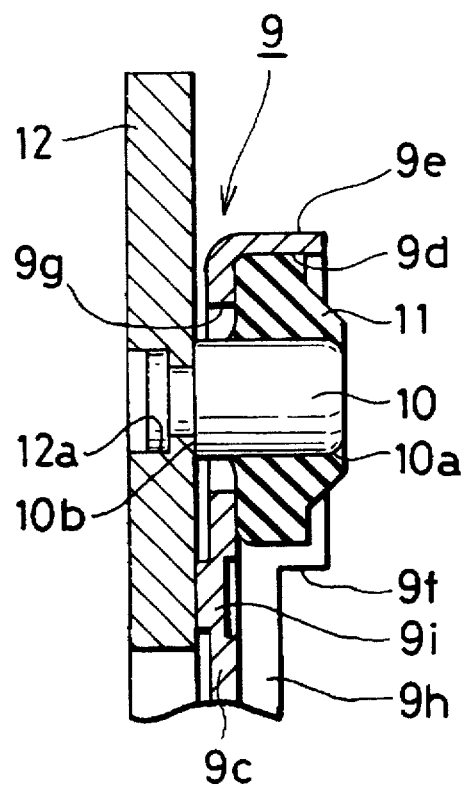
FIG. 4 is an enlarged cross-sectional view taken along line B—B in FIG. 3.
Figure 5:
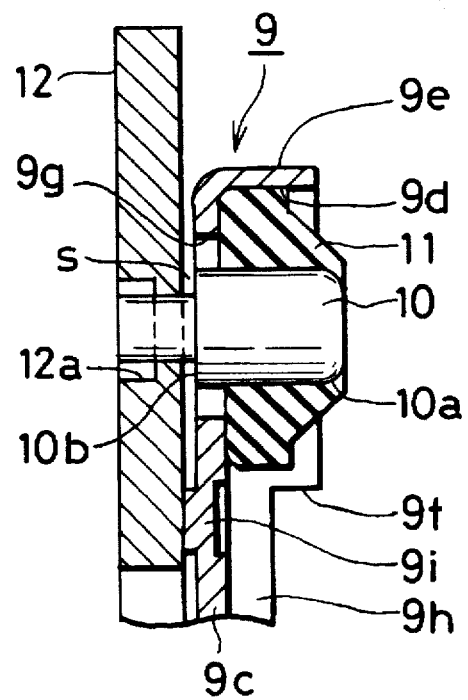
FIG. 5 is an enlarged cross-sectional view taken along line B—B of FIG. 3 prior to staking the torque transmitting member to the armature.

The armature assembly 15, shown in FIG. 3, differs from the armature assembly 4 shown in FIG. 1 only in that it has five damper covers 9e and in the way in which the initial spring loading of the rubber damper 11 is set. The two extra rubber dampers 11 distribute the force over the stop plate 9 and thereby make it possible to reduce the thickness of the stop plate. Component parts of the armature assembly 15 which are the same as parts in the armature assembly 4 are given the same reference numbers. Description of the parts of the armature assembly 15 that are the same as parts of the armature assembly 4 are not repeated below. The stop plate 9 of the armature assembly 15 is formed from a thin steel plate in a press. A plurality of projections 9i (five in the embodiment of FIG. 3) are formed in the stop plate 9 and project axially toward the armature 12. Initial spring load (restoring force) of each rubber damper 11 is set by the dimensions of the space S (see FIG. 5) formed between an end surface 10b of the large diameter cylindrical portion of the torque pin 10 and the projections 9i on the stopper plate 9 before the small diameter cylindrical portion of the torque pin is riveted into the stepped hole 12a of the armature 12. The reduced axial thickness of the stop plate 9 results in the end surface 10b of the torque pin 10 being in substantially the same transverse plane as the surface of the stop plate 9 facing the armature 12 when the rubber damper 11 is unloaded. If the armature 12 was riveted to the torque pins 10 in this situation without the projections 9i on the stop plate 9, there would be little or no resilient biasing force urging the armature toward the stop plate. The added projections 9i formed in the stop plate 9, which project axially toward the armature 12, provide the space S described above. The space S provides the initial spring loading of the rubber dampers 11 when the torque pin 10 is fastened into the stepped bore 12a in the armature 12 and is staked or riveted in place. The other aspects of the configuration in its operation are the same as that of the armature assembly 4.

The embodiments described in detail above have been provided with flanges 9c extending tangentially in the direction of rotation of the stop plate 9. Damper covers 9e are formed on the ends of the flanges 9c. It is also possible to provide the damper covers on flanges that extend radially outward from the boss 9b without being curved. The design may also be modified, for example, by having damper covers 9e and rubber dampers 11 and torque pins 10 of rectangular cross-section, or interposing a rubber damper between the stop plate 9 and the armature 12.

With the electromagnetic coupling device of this invention, because the chamber walls 9d of the damper covers 9e of the stop plate 9 are open to the boss 9b on the side in which the rubber damper 11 will be pulled in tension relative to a hypothetical line connecting the center of the rotational shaft 3 in the center of the torque pin 10, it follows that substantial resilient deformation of the rubber damper due to compression, shear and tension stresses is prevented. Portions of the rubber damper in the opening of the damper cover facing the boss are able to move with the torque pin 10. This movement reduces the maximum stress on the rubber damper 11. Durability of the rubber damper 11 is improved by reducing the maximum stress. Thus, the reliability of low cost electromagnetic coupling devices is improved.

The electromagnetic coupling device has a stop plate 9 with a boss 9b secured to the hub 7. A plurality of flanges 9c extend radially outward from the boss 9b. A plurality of damper covers 9e surrounded by chamber walls 9d and each having a peripheral wall opening facing toward the boss, are formed on the free ends of the flanges 9c. A circular arc-shaped peripheral wall 9h with a large radius of curvature is formed between adjacent damper covers. The circular arc-shaped peripheral wall 9h can be formed in a press without developing cracks in the peripheral wall.

The stopper plate 9 has a boss 9b secured to the armature hub 7 and a plurality of flanges 9c extending tangentially from the boss in the direction of rotation. A damper cover 9e surrounded by chamber walls 9d constituted by the peripheral wall 9a is formed on each flange. The chamber walls 9d open on the side facing toward the boss. The hub 9b of the stop plate 9 is provided inward in the radial direction from the damper covers 9e and a lighter weight, smaller and less expensive electromagnetic coupling device with superior strength is achieved.

The peripheral wall 9a extending around the entire periphery of the stop plate 9 and the integral damper covers 9e make is possible to reduce the thickness of the stop plate and retain adequate strength. A thin steel plate is relatively easy to form into a stop plate 9 in a press. An electromagnetic coupling device employing the stop plate is lighter in weight and reduces vehicle weight.

Obviously, many modifications and variations of the present invention are possible in light of the above teachings. It is, therefore, to be understood that within the scope of the appended claims, the invention may be practiced otherwise than as specifically as described.

The embodiments of the invention and which an exclusive property or privilege is claimed are defined as follows:

1. An electromagnetic coupling device characterized in that it is equipped with an armature hub mounted on a rotational shaft; a stop plate which is a press-molded sheet steel article that has formed in it a peripheral wall extending in the axial direction on the periphery, and is provided with a boss secured to said armature hub and with a plurality of damper covers each of which is partially surrounded by chamber walls constituted by the above-mentioned peripheral wall, and an opening the chamber walls of each of the damper covers on the side of the damper cover adjacent to said boss; a torque transmitting member having one end adhered fixedly to a rubber damper housed in each damper cover of the stop plate, and the other end of which is secured to an armature provided on the side of the stop plate opposite the damper cover; a field core provided on its inside with an electromagnetic coil which magnetically attracts the armature against the resilient force of each of the rubber dampers; and, relative to a hypothetical line connecting the center of the rotational shaft and the center of the torque transmitting member, said opening in the chamber walls of each of the damper covers of the stop plate is on the side of the hypothetical line in which the rubber damper will be pulled.

2. An electromagnetic coupling device as set forth in claim 1 characterized in that at least one projection is formed in the stop plate and each of the rubber dampers is put under an initial spring loading by securing the torque transmitting member to the armature with the armature in contact with the projection.

3. Electromagnetic coupling device characterized in that it is equipped with an armature hub mounted on a rotational shaft; a stop plate which is a press-molded sheet steel article that has formed in it a peripheral wall extending in the axial direction on the periphery, has a boss secured to the armature hub and has a plurality of flanges provided extending radially outward from the boss, and which is provided, at a free end of each of the flanges, with a damper cover which is partially surrounded by chamber walls constituted by the peripheral wall, and an opening in the chamber walls of each of the damper covers of the side of the damper cover adjacent to the boss; a torque transmitting member having one end adhered fixedly to a rubber damper housed in each damper cover of the stop plate, and the other end of which is secured to an armature provided on the side of the stop plate opposite the damper cover; a field core provided on its inside with an electromagnetic coil which magnetically attracts the armature against the resilient force of the rubber dampers; and relative to a hypothetical line connecting the center of the rotational shaft and the center of the torque transmitting member, said opening in the chamber walls of each of the damper covers of the stop plate is on the side of the hypothetical line in which the rubber dampers will be pulled.

4. An electromagnetic coupling device as set forth in claim 3, characterized in that at least one projection is formed in the stop plate and each of the ribber dampers is put under an initial spring loading by securing the torque transmitting member to the armature with the armature in contact with the projection.

5. An electromagnetic coupling device characterized in that it is equipped with an armature hub mounted on a rotational shaft; a stop plate which is a press-molded sheet steel article that has formed in it a peripheral wall extending in the axial direction on the periphery, has a boss secured to the armature hub and has a plurality of flanges provided extending tangentially from the boss in the direction of rotation, and which is provided, at a free end of each of the flanges, with a damper cover which is partially surrounded by chamber walls constituted by the peripheral wall, an opening in the chamber walls of each of the damper covers on the side of the damper cover adjacent to the boss; a torque transmitting member having one end adered fixedly to a rubber damper housed in each damper cover of the stop plate, and the other end of which is secured to an armature provided on the side of the stop plate opposite the damper cover; a field core provided on its inside with an electromagnetic coil which magnetically attracts the armature against the resilient force of the rubber dampers; and, relative to a hypothetical line connecting the center of the rotational shaft and the center of the torque transmitting member, said opening in the chamber walls of each of the damper covers of the stop plate is on the side of the hypothetical line in which the rubber damper will be pulled.

6. An electromagnetic coupling device as set forth in claim 5 characterized in that at least one projection is formed in the stop plate and each of the rubber dampers is put under an initial spring loading by securing the torque transmitting member to the armature with the armature in contact with the projection.

7. An electromagnetic coupling device characterized in that it is equipped with an armature hub mounted on a rotational shaft; a stop plate which is a press-molded sheet steel article that has formed in it a peripheral wall extending in the axial direction on the periphery, and is provided with a boss secured to said armature hub and with a plurality of damper covers each of which is partially surrounded by chamber walls constituted by a portion of said peripheral wall and has an opening in the chamber walls; a torque transmitting member having one end adhered fixedly to a rubber damper housed in each damper cover of the stop plate, and the other end of which is secured to an armature provided on the side of the stop plate opposite the chamber walls; and a field core provided on its inside with an electromagnetic coil which magnetically attracts the armature against the resilient force of each of the rubber dampers.

* * * * *